US008063659B2

(12) United States Patent
Grinchuk et al.

(10) Patent No.: US 8,063,659 B2
(45) Date of Patent: *Nov. 22, 2011

(54) LOW DEPTH PROGRAMMABLE PRIORITY ENCODERS

(75) Inventors: Mikhail Grinchuk, San Jose, CA (US);
Anatoli Bolotov, Cupertino, CA (US);
Sergei B. Gashkov, Moscow (RU); Lav D. Ivanovic, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/902,376

(22) Filed: Oct. 12, 2010

(65) Prior Publication Data
US 2011/0029980 A1    Feb. 3, 2011

Related U.S. Application Data

(63) Continuation of application No. 12/465,810, filed on May 14, 2009, now Pat. No. 7,839,164.

(51) Int. Cl.
*G06F 7/38* (2006.01)
*H03K 19/173* (2006.01)
(52) U.S. Cl. ............... 326/38; 326/39; 326/41; 326/47
(58) Field of Classification Search .................. None
See application file for complete search history.

(56) References Cited

U.S. PATENT DOCUMENTS

| 6,462,694 | B1 | 10/2002 | Miyatake | 341/160 |
| 6,934,733 | B1 | 8/2005 | Gashkov et al. | 708/706 |
| 7,382,794 | B1 * | 6/2008 | Zheng et al. | 370/412 |
| 2005/0216636 | A1 | 9/2005 | Yamasaki et al. | 710/264 |

OTHER PUBLICATIONS

Pankaj Gupta et al., "Designing and Implementing A Fast Crossbar Scheduler", IEEE Micro, Jan./Feb. 1999, pp. 20-28.
Peter M. Kogge et al., "A Parallel Algorithm for the Efficient Solution of a General Class of Recurrence Equations", IEEE Transaction on Computers, 1973, C-22, pp. 783-791.

* cited by examiner

*Primary Examiner* — Anh Tran
(74) *Attorney, Agent, or Firm* — Christopher P. Maiorana, PC

(57) ABSTRACT

An apparatus having a plurality of first circuits, second circuits, third circuits and fourth circuits is disclosed. The first circuits may be configured to generate a plurality of first signals in response to (i) a priority signal and (ii) a request signal. The second circuits may be configured to generate a plurality of second signals in response to the first signals. The third circuits may be configured to generate a plurality of enable signals in response to the second signals. The fourth circuits may be configured to generate collectively an output signal in response to (i) the enable signals and (ii) the request signal. A combination of the first circuits, the second circuits, the third circuits and the fourth circuits generally establishes a programmable priority encoder. The second signals may be generated independent of the enable signals.

20 Claims, 16 Drawing Sheets

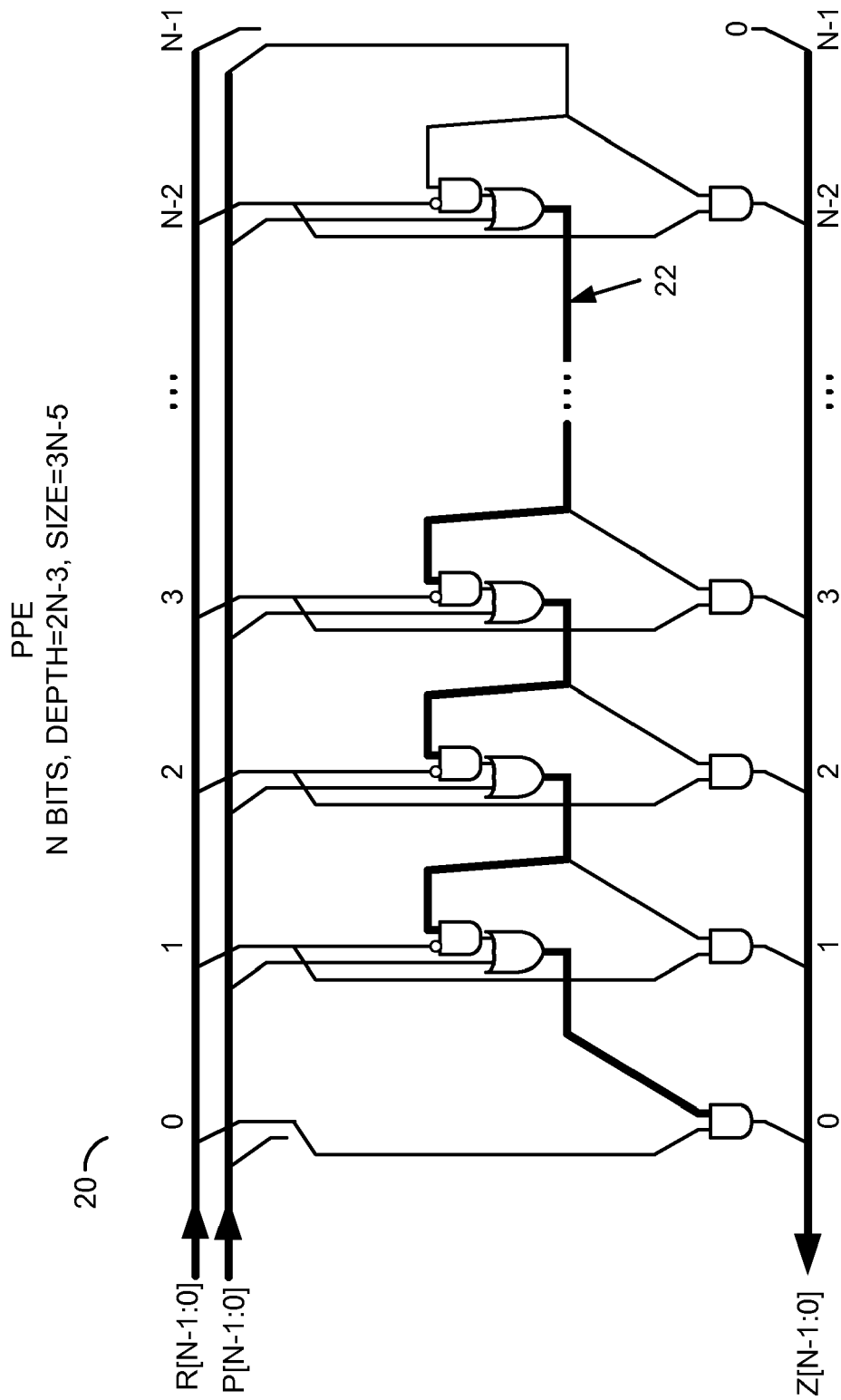
FIG. 1
(CONVENTIONAL)

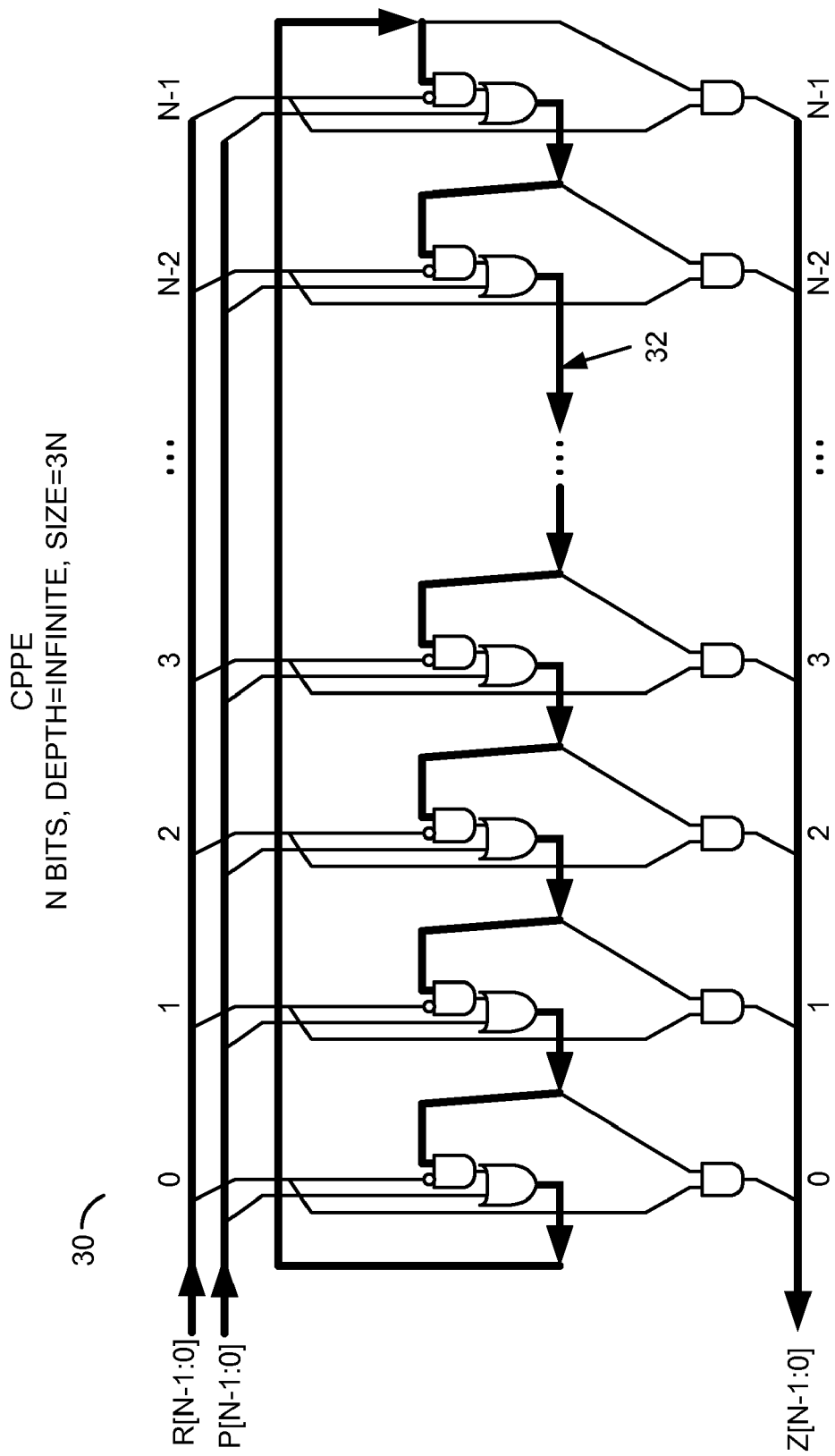
FIG. 2
(CONVENTIONAL)

LOW DEPTH PROGRAMMABLE PRIORITY ENCODERS

This is a continuation of U.S. Ser. No. 12/465,810, filed May 14, 2009, now U.S. Pat. No. 7,839,164 which is incorporated by reference.

FIELD OF THE INVENTION

The present invention relates to priority encoders generally and, more particularly, to a method and/or apparatus for implementing low depth programmable priority encoders.

BACKGROUND OF THE INVENTION

Priority encoders are useful logic to determine arbitrated situations that can be used in various applications. A priority encoder transfers only a single logical one bit in a highest priority position within an N-bit request signal (i.e., R) to a corresponding position an N-bit output signal (i.e., Z). Programmable priority encoders operate as multiple parallel encoders under the control of a priority signal (i.e., P).

Referring to FIG. 1, a netlist of a conventional programmable priority encoder (PPE) circuit 20 is shown. The circuit 20 uses a ripple carry implementation that creates a long timing path 22. For an N-bit signal R, the long path 22 causes a 2N−3 Boolean gate delay through the circuitry. Hence, the circuit 20 has difficulty operating at high clock speeds (i.e., >900 MHz), even for moderate values of N.

Referring to FIG. 2, a netlist of a conventional explanatory technique for a circular programmable priority encoder (CPPE) circuit 30 is shown. A path 32 in the circuit 30 forms a closed combinational loop. The loop can result in an effectively infinite delay through the circuitry in situations where the values received in the signals R and P cause the loop to oscillate.

It would be desirable to implement a programmable priority encoder and a circular programmable priority encoder without the path 22 or the path 32.

SUMMARY OF THE INVENTION

The present invention concerns an apparatus having a plurality of first circuits, second circuits, third circuits and fourth circuits. The first circuits may be configured to generate a plurality of first signals in response to (i) a priority signal and (ii) a request signal. The second circuits may be configured to generate a plurality of second signals in response to the first signals. The third circuits may be configured to generate a plurality of enable signals in response to the second signals. The fourth circuits may be configured to generate collectively an output signal in response to (i) the enable signals and (ii) the request signal. A combination of the first circuits, the second circuits, the third circuits and the fourth circuits generally establishes a programmable priority encoder. The second signals may be generated independent of the enable signals.

The objects, features and advantages of the present invention include providing apparatus for implementing low depth programmable priority encoders that may (i) provide a short propagation delay, (ii) have a low Boolean logic gate count and/or (iii) have a low fanout.

BRIEF DESCRIPTION OF THE DRAWINGS

These and other objects, features and advantages of the present invention will be apparent from the following detailed description and the appended claims and drawings in which:

FIG. 1 is a netlist of a conventional programmable priority encoder (PPE) circuit;

FIG. 2 is a netlist of a conventional explanatory technique for a circular programmable priority encoder (CPPE) circuit;

DETAILED DESCRIPTION OF THE PREFERRED EMBODIMENTS

Embodiments of the present invention generally describe fast (e.g., low depth) implementations of non-circular programmable priority encoders and circular programmable priority encoders. Example implementations are generally shown either for a general case of N-bit input/output signals or for a particular case of N=26 bits. In the second case however, other bit-sizes may be implemented to meet the criteria of a particular application. Each of the implementations may provide a short propagation delay and have a moderate gate count. Some of the embodiments may be implemented as, but are not limited to, hardware-only designs.

Figure 3:
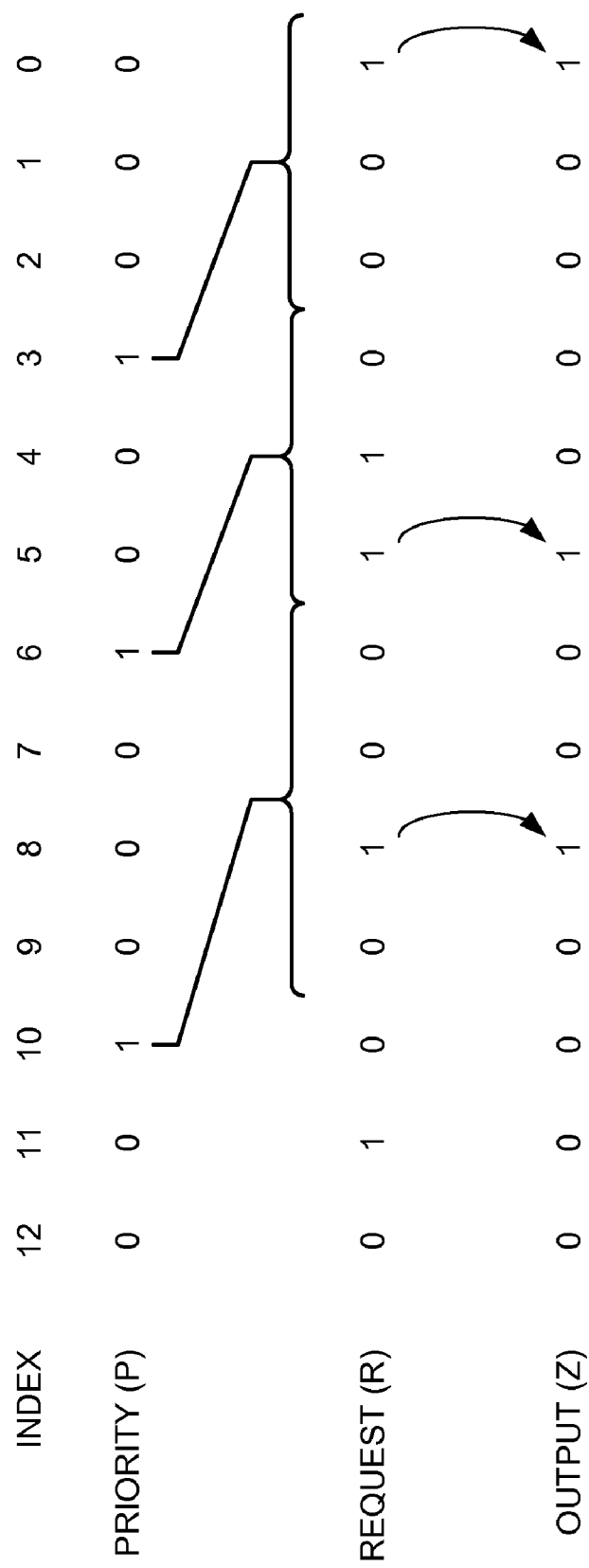
FIG. 3 is a diagram illustrating an example segmentation operation of a PPE.

Referring to FIG. 3, a diagram illustrating an example segmentation operation of a programmable priority encoder (PPE) is shown. A (non-circular) PPE generally has two inputs: a request signal (e.g., R) having N bits and a priority signal (e.g., P) having N bits. The PPE generally generates an output signal (e.g., Z), also having N bits. The N-bit PPE may be denoted as $PPE_N$ or PPE(N) or PPE_N. Generation of the signal Z in response to the signal R and the signal P may be as follows. The priority bits of the signal P may specify partitioning of a set of request bits $\{0, 1, \ldots, N-1\}$ of the signal R into pieces or subsets. A single asserted (e.g., logical one) request bit of the signal R within each of the pieces (e.g., the request bit in a higher priority position within the respective piece, if multiple request bits exist) may be transferred to the same bit-position in the signal Z. For example, moving left-to-right, the active (e.g., logical one) priority bits at indices 10, 6 and 3 generally establish subsets or segments covering indices 9 to 6, 5 to 3 and 2 to 0 respectively. The indices 12 to 10 are not covered by any active priority bits and thus the corresponding bits in the signal Z are generated deasserted (e.g., logical zero) regardless of associated bits in the signal R.

The above operation may be described as a scanning process with an internal 1-bit variable (e.g., ENABLE) as follows:

```
ENABLE = 0;
for(i = N-1; i ≧ 0; i--)
{
    Z[i] = R[i] & ENABLE;
    ENABLE = (~R[i] & ENABLE) | P[i];
}
```

The notations "&" may represent a Boolean AND operation, "|" may represent a Boolean OR operation, "~" may represent a Boolean NOT operation and X[i] may represent the $i^{th}$ bit of a multi-bit signal X. The input bits R[N−1] and P[0], and the output bit Z[N−1] may be dummy bits. The dummy bits are generally used in the above text for the uniformity with the following description of a circular programmable priority encoder (CPPE).

A CPPE generally has the two inputs: the signal R and the signal P. The CPPE may generate the output signal Z. The N-bit CPPE may be denoted as $CPPE_N$ or CPPE(N) or CPPE_N. The functionality of the CPPE is generally similar to the above-described functionality of the PPE, with a modification. The modification may establish that an initial value of the variable ENABLE matches a final value. To avoid looping, notice that given values of the signal R and the signal P may establish at most three behaviors in a transformation of $ENABLE_{OLD}$ to $ENABLE_{NEW}$:

(i) $ENABLE_{NEW}=0$
(ii) $ENABLE_{NEW}=1$
(iii) $ENABLE_{NEW}=ENABLE_{OLD}$

Notice that behavior (iii) may occur in a single case: when all bits of both signals R and P are zero. In such a case, all of the bits in the output signal Z may also be zero for any initial value of ENABLE. Thus, the "for" loop mentioned above for the PPE may be repeated twice: the first iteration generally initializes the variable ENABLE and the second iteration may actually compute output values in the signal Z.

The above operation may be described as a scanning process as follows:

```
ENABLE = 0;
for(i = N-1; i ≧ 0; i--)
{
    ENABLE = (~R[i] & ENABLE) | P[i];
}
for(i = N-1; i ≧ 0; i--)
{
    Z[i] = R[i] & ENABLE;
    ENABLE = (~R[i] & ENABLE) | P[i];
}
```

The following notations may be applied:

For a function/operator/circuit F, a complexity may be denoted by a complexity parameter (e.g., LF). For example, LPPE may represent a complexity of a PPE. The complexity LF may identify a gate count in terms of Boolean 2-input AND logic gates and Boolean 2-input OR logic gates. Boolean NOT logic gates may be considered as "free" and thus generally do not contribute to the complexity LF.

For the function/operator/circuit F, a depth may be denoted by depth parameter (e.g., DF). For example, DPPE may represent a depth of a PPE. The depth DF may establish a number of logic levels, also in terms of the Boolean 2-input AND logic gates and the Boolean 2-input OR logic gates. Boolean NOT logic gates may again be considered "free" and thus generally do not contribute to the depth DF.

A function $F_N(T[N-1], \ldots, T[0])$, where N may be an even number, is generally defined as follows:

$$F_N = T[N-1] | (T[N-2] \& (T[N-3] | (T[N-4] \& ( \ldots (T[2] \& T[1]) \ldots )))),$$

where the value T[0] may be omitted and $F_0=0$. The function $F_N$ may also be written as F(N) or F_N.

Embodiments of the present invention generally produce low-depth implementations of a programmable priority encoder (PPE) and/or a circular programmable priority encoder (CPPE) based on efficient circuit implementations of the function $F_N$. A PPE may be expressed via the function $F_N$ as follows:

$$Z[i]=R[i]\&ENABLE[i], i=0 \ldots N-1,$$

where ENABLE[N−1−i]=$F_{2i}$(P[N−i], ~R[N−i], P[N−i+1], ~R[N−i+2], …, P[N−1], ~R[N−1])

Figure 4:
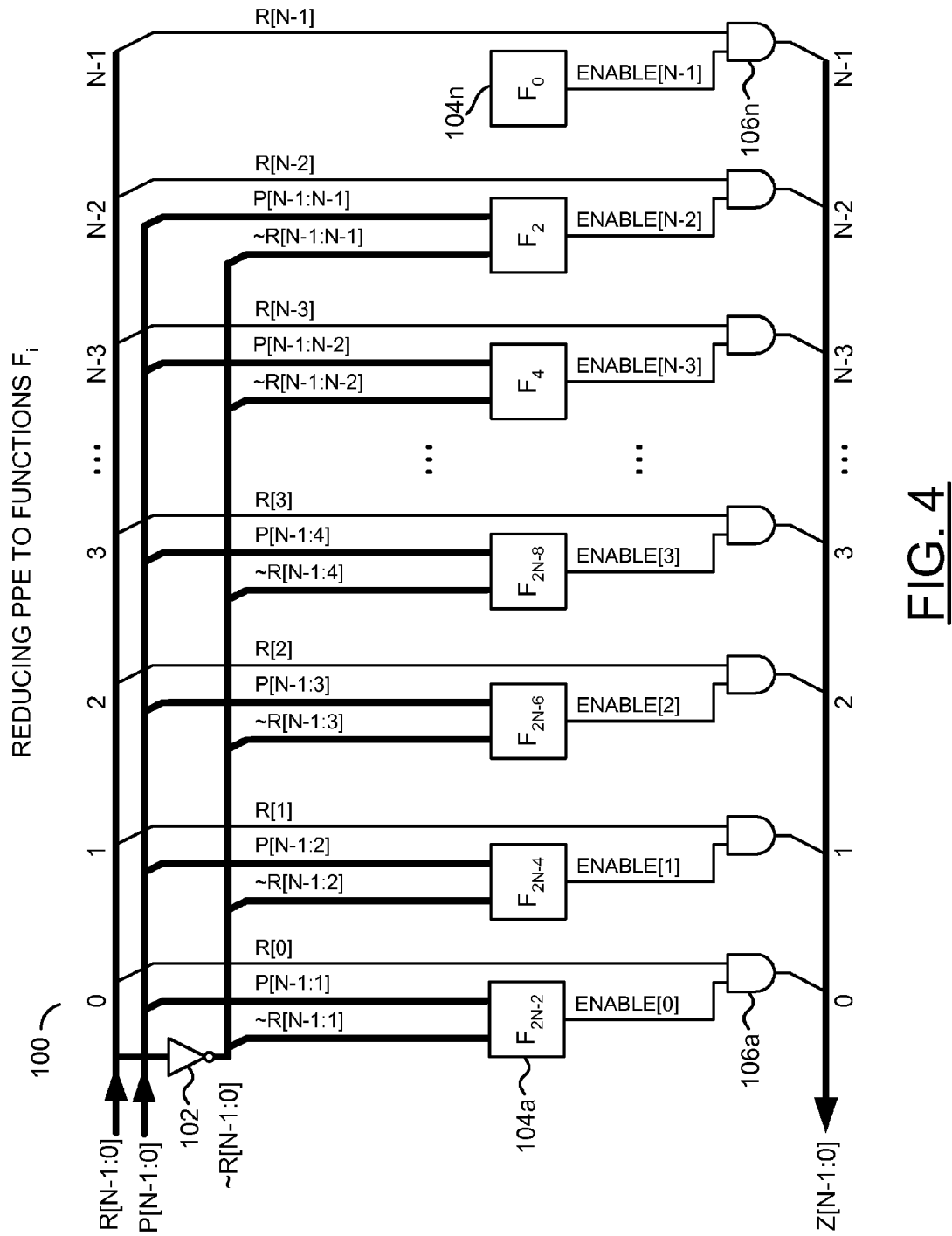
FIG. 4 is a block diagram of a functional implementation of a PPE circuit.

Referring to FIG. 4, a block diagram of a functional implementation of a PPE circuit 100 is shown. The circuit 100 generally comprises a circuit 102, multiple circuits 104a-104n and multiple circuits 106a-106n. The circuit 102 may receive the signal R. An inverted signal (e.g., ~R) may be generated by the circuit 102. Each of the circuits 104a-104n may receive appropriate parts of the signal P and the signal ~R. An enable signal (e.g., E) may comprise multiple variables ENABLE (e.g., ENABLE[i]=E[i], for i=0 … N−1). The individual components of the signal E may be generated by the circuits 104a-104n and routed to a respective one of the circuits 106a-106n. The circuits 106a-106n may also receive the signal R. The signal Z may be collectively generated by the circuits 106a-106n by concatenating the individual bits generated by the circuits 106a-106n.

The circuit 102 generally comprises an N-bit wide inverter. Each of the circuits 106a-106n generally comprises a 2-input AND logic gate. One of the logic gates may receive a respective bit of the signal E. The other logic gate may receive a respective bit of the signal R. A combination of the N 1-bit output signals generated by the circuits 106a-106n may be grouped to form the signal Z. Each of the circuit 104a-104n may implement a respective function $F_{2N-2}, F_{2N-4}, \ldots, F_0$ using different combinations of bits from the signal P and the signal ~R.

Given an implementation of a function $F_k$ corresponding to each of the circuits 104a-104n, the circuits 104a-104n may have a respective depth $DF_k$ and a respective gate count $LF_k$, where k=0, 2, 4, …, 2N−2. When the circuits 104a-104n are combined, the circuit 100 may be implemented with a depth $DPPE_N \leq 1+DF_{2N-2}$ and a gate count $LPPE_N \leq N+LF_0+LF_2+LF_4+ \ldots +LF_{2N-2}$. The gate count $LPPE_N$ may be reduced if the circuits 104a-104n can share common parts.

Generally, a CPPE may be implemented in multiple ways.

Figure 5:
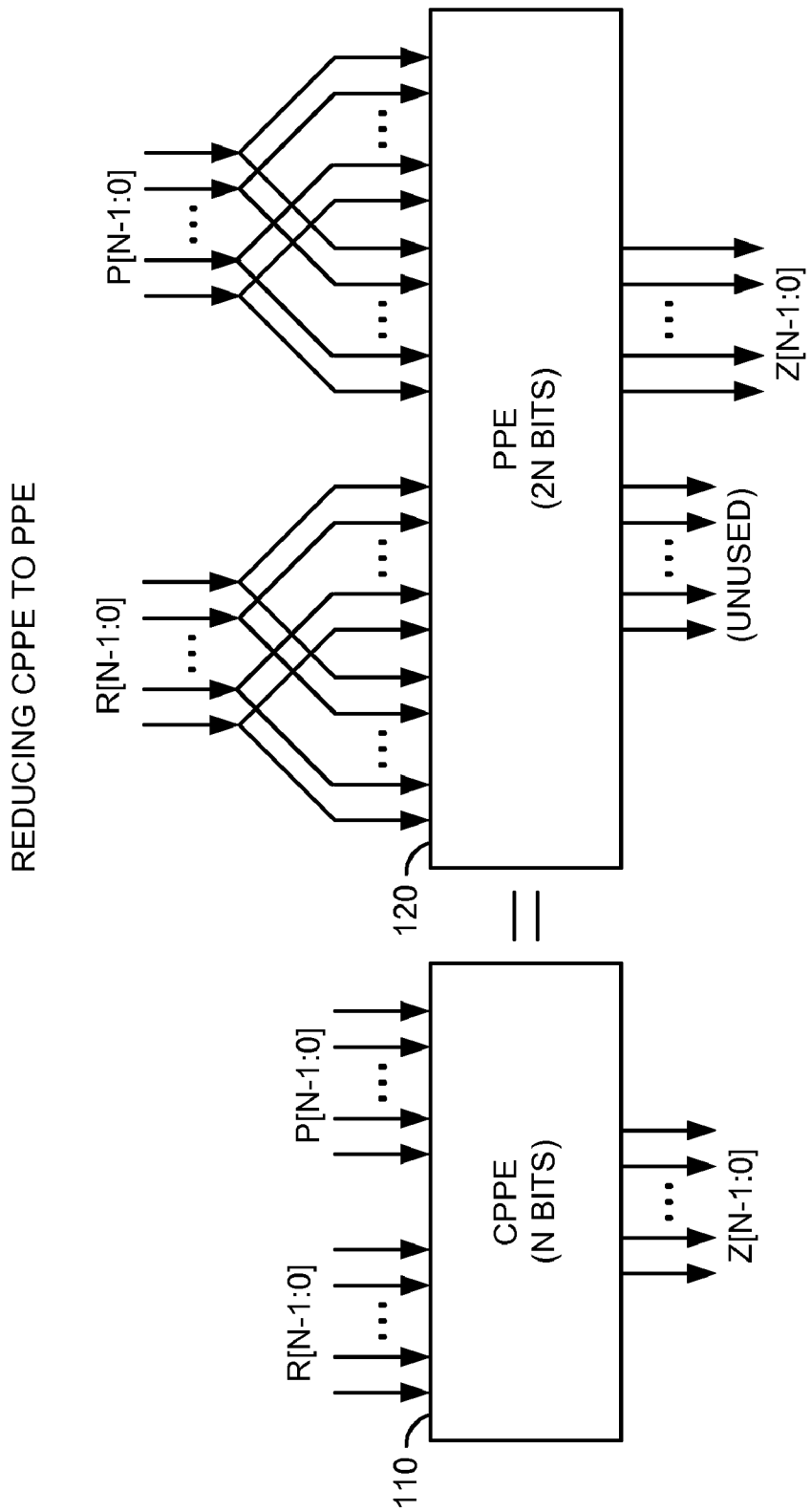
FIG. 5 is a diagram of an example transformation of a PPE circuit into a CPPE circuit.

Referring to FIG. 5, a diagram of an example transformation of a PPE circuit 120 into a CPPE circuit 110 is shown. Based on the definitions provided above, the N-bit circuit 110 may be implemented via the 2N-bit circuit 120. Half of the circuit 120 may be used to calculate the variable ENABLE and the other half may be used to calculate the signal Z. For example, Z[N−1:0]=CPPE(P[N−1:0], R[N−1:0]) may be replaced by {Dummy[N−1:0], Z[N−1:0]}=PPE({P[N−1:0], P[N−1:0]}, {R[N−1:0], R[N−1:0]}), where the "Dummy" bus is introduced just to explicitly provide a bit-to-bit correspondence in the assignment; the "Dummy" bus is generally not used elsewhere. (In the text, the notation "{A, B, C, … }" generally denotes concatenation of the individual signals A, B, C, ... into a common bus, and "X[i:j]" may represent a signal extracted from the $i^{th}$ bit to the $j^{th}$ bit of a bus X, that is X[i:j] is a shortcut for concatenation {X[i], ..., X[j]}. In the text, the bits are generally indexed in a descending order, that is i>j). Hence, the depth $DCPPE_N \leq DPPE_{2N} \leq 1+DF_{4N-2}$ and the gate count $LCPPE_N \leq LPPE_{2N} \leq 2N+LF_0+LF_2+LF_4+\ldots+LF_{4N-2}$.

Figure 6:
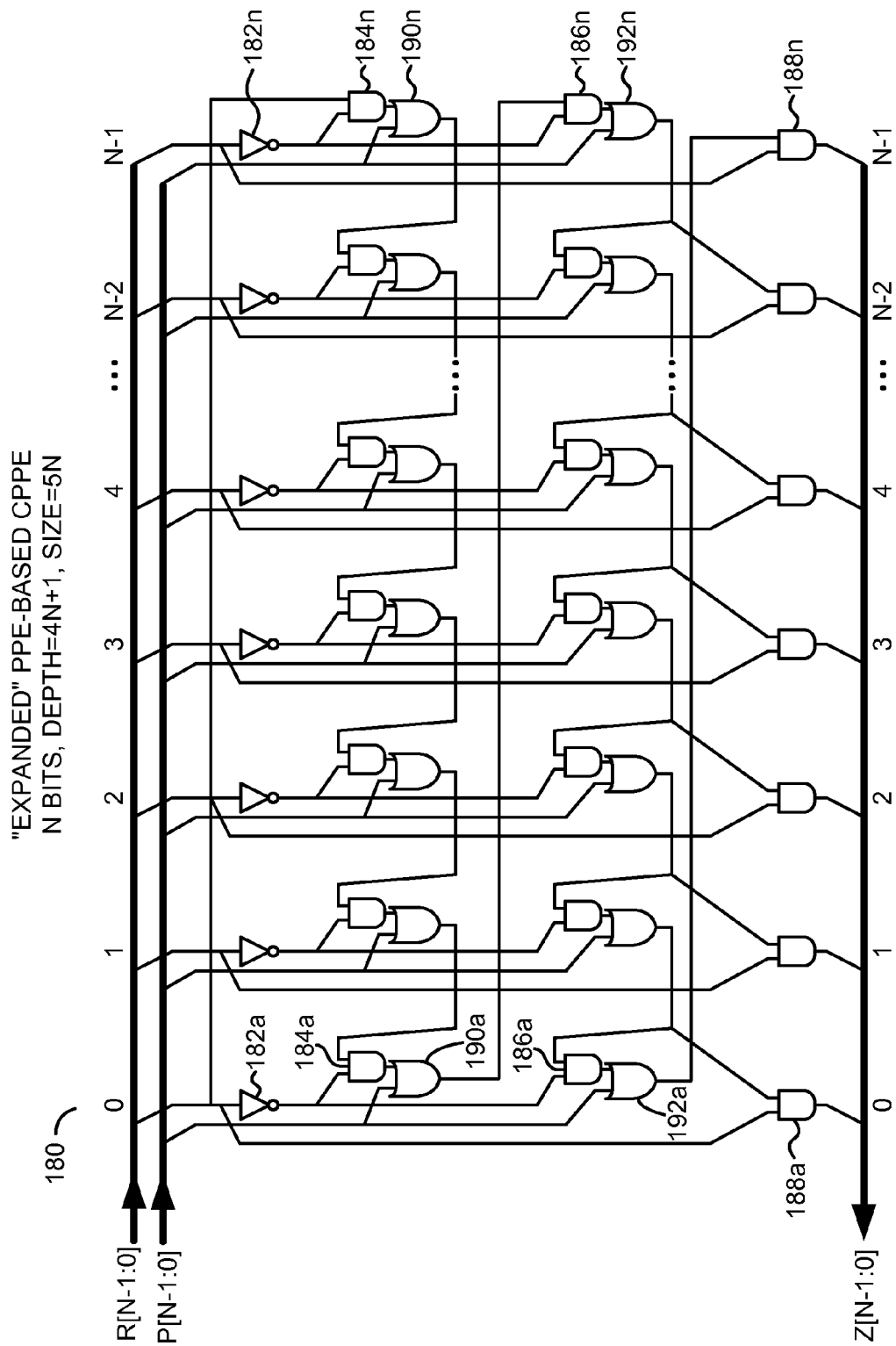
FIG. 6 is a block diagram of an example implementation of an N-bit CPPE circuit.

Referring to FIG. 6, a block diagram of an example implementation of an N-bit CPPE circuit 180 is shown. The circuit 180 may be based on the transformation shown in FIG. 5, applied to a PPE shown in FIG. 1. The circuit 180 generally comprises multiple (e.g., N) inverters 182a-182n, multiple (e.g., 3N) 2-input AND logic gates 184a-184n, 186a-186n, 188a-188n and multiple (e.g., 2N) 2-input OR logic gates 190a-190n, 192a-192n. The circuit 180 generally has a depth of 4N+1 logic gate levels and utilizes 5N of the 2-input logic gates.

Another implementation approach is generally based on the cyclical structure of the function of a $CPPE_N$ as follows:

Z[i]=R[i]&ENABLE[i],i=0 ... N-1, where ENABLE[i]=$F_{2i}$(P[i % N], ~R[i % N], P[(i+1)% N], ~R[(i+1)% N], ..., P[(i+N-1)% N], ~R[(i+N-1)% N])

Notation "x % y" generally represents a modulus operation, that is the remainder after an integer division x/y. The above expansion generally gives a depth $DCPPE_N \leq 1+DF_{2N-2}$ and a gate count $LCPPE_N \leq N+N\ LF_{2N-2}$.

Figure 7:
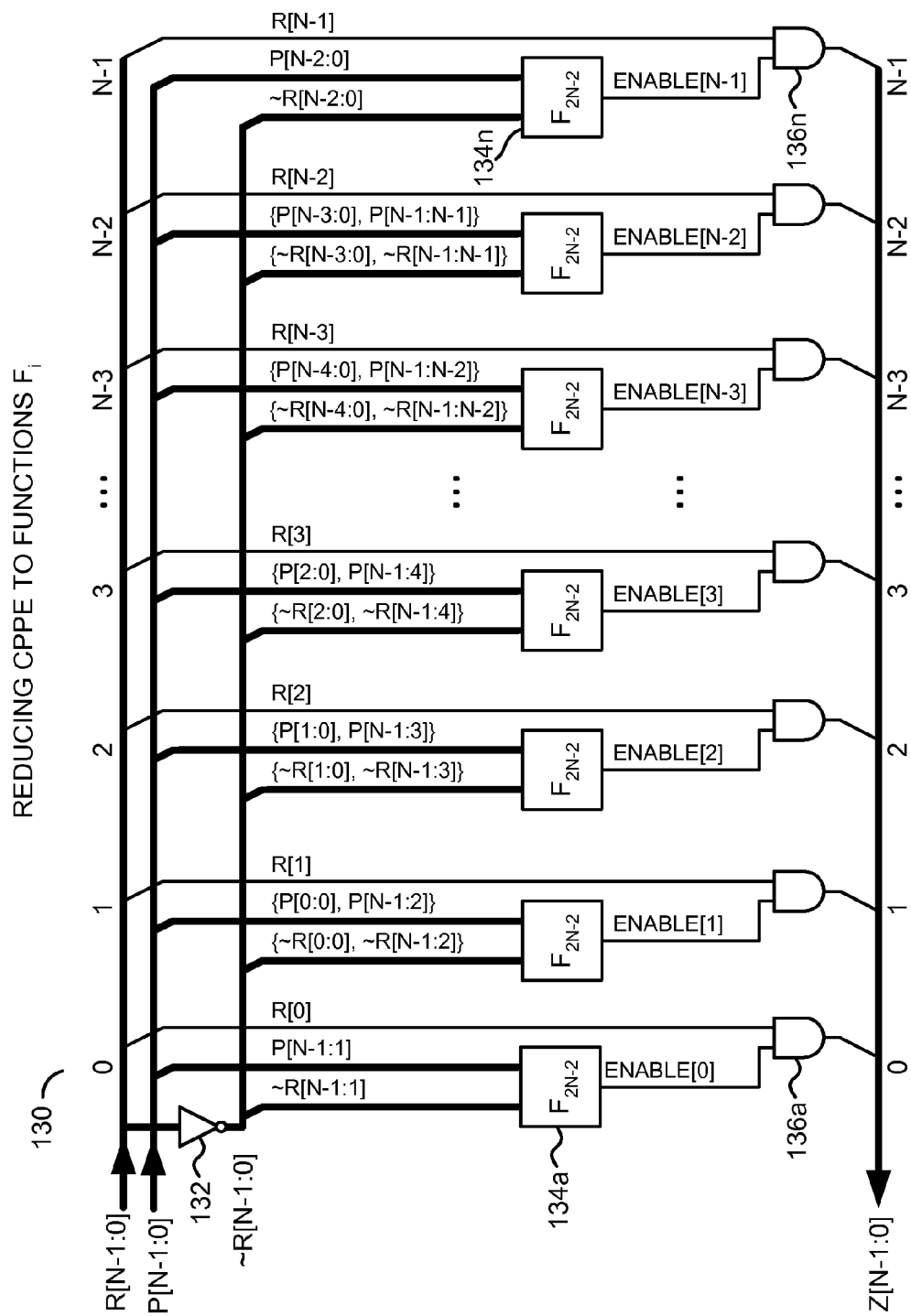
FIG. 7 a block diagram of a functional implementation of a CPPE circuit.

Referring to FIG. 7, a block diagram of a functional implementation of a CPPE circuit 130 is shown. The circuit 130 generally comprises a circuit 132, multiple circuits 134a-134n and multiple circuits 136a-136n. The circuit 132 may receive the signal R. The inverted signal ~R may be generated by the circuit 132. Each of the circuits 134a-134n may receive the signal P and the signal ~R. A component of the signal ENABLE may be generated by the circuits 134a-134n and routed to a respective one of the circuit 136-136n. The circuits 136a-136n may also receive the signal R. The signal Z may be generated by the circuits 136a-136n. The gate count $LCPPE_N$ may be reduced if N circuits for the (2N-2)-input functions F (with different inputs) can share common parts.

The circuit 132 generally comprises an N-bit wide inverter. Each of the circuits 136a-136n generally comprises a 2-input AND logic gate. One of the inputs of each AND gate may receive a respective bit of the signal E. The other input of the AND gate may receive a respective bit of the signal R. A combination of the N 1-bit output signals generated by the circuits 136a-136n may be grouped to form the signal Z. Each of the circuits 134a-134n may implement the function $F_{2N-2}$ using different combinations of bits from the signal P and the signal ~R.

Figure 8A:
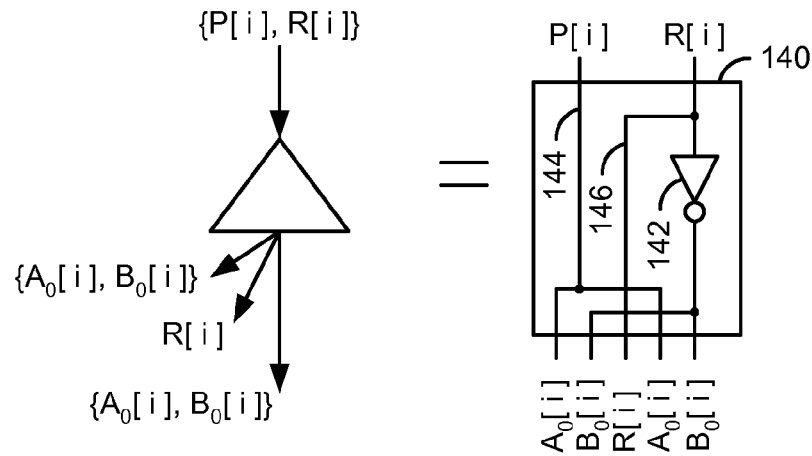
FIGS. 8A-8D are diagrams of shortcut notations.

Shortcut notations (e.g., FIGS. 8A-8D) may be used to represent PPE/CPPE circuit designs. As an illustrative example, the circuit 180 of FIG. 6 may be redrawn as FIG. 9 using the notations. Referring to FIGS. 8A-8D, diagrams of shortcut notations useful to represent particular implementations of a PPE and/or a CPPE are shown. In FIG. 8A, a triangle shortcut notation may represent a "preparation" step. Each of the triangles may represent a circuit 140 generally comprising an inverter logic gate 142 and multiple feed-through paths 144 and 146. In the $i^{th}$ circuit 140, the gate 142 may invert a corresponding bit (e.g., R[i]) of the signal R to generate a corresponding bit (e.g., $B_0[i]$) of the signal ~R. The feed-through 144 may present a bit (e.g., P[i]) of the signal P as an output bit (e.g., $A_0[i]$). The feed-through 146 may present the bit R[i] as an output bit.

The vertical outgoing arrow below the triangle may represent a 2-bit bus {$A_D[i], B_0[i]$}. The diagonal arrow nearest the vertical arrow may represent the signal R[i]. The other diagonal arrow (where present) may also represent the 2-bit bus {$A_0[i], B_0[i]$}. Individually and/or collectively, the signals presented by the circuits 140 may be referred to as first signals. Generally, the bits $A_N[i]$ may also be written as A[N] [i] or A_N[i]. Likewise, $A_N$ may be written as A(N) or A_N. The bits $B_N[i]$ may be written as B[N] [i] or B_N[i]. In a similar manner, $B_N$ may be written as B(N) or B_N.

Figure 8B:
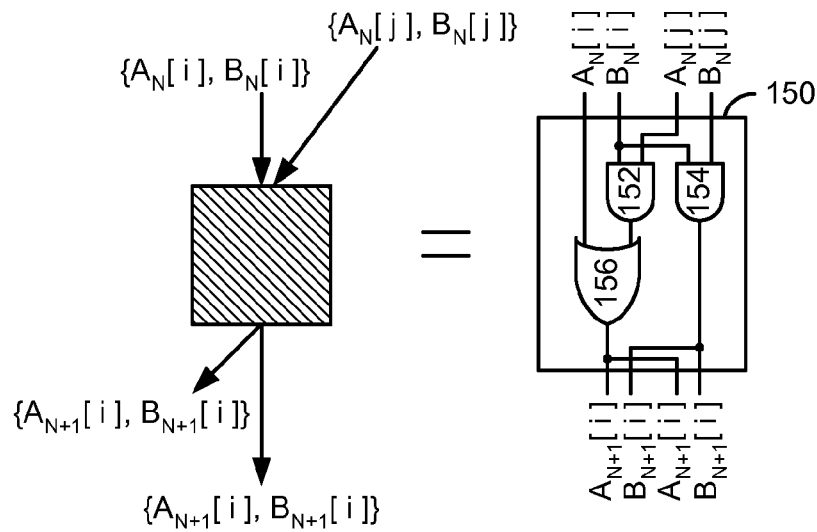

In FIG. 8B, a shaded square notation may represent the above-described operation T implemented by a circuit 150. Each of the circuits 150 generally comprises a circuit 152, a circuit 154 and a circuit 156. Each of the circuits 150 generally receives multiple (e.g., 4) binary inputs and generates multiple (e.g., 2) binary outputs. In the shortcut notation, all incoming/outgoing arrows connected to the circuit may represent 2-bit busses with bits named A and B. Each of the outputs may have a typical fanout of 2.

The circuit 152 may be implemented as a 2-input AND logic gate. The circuit 154 may be implemented as another 2-input AND logic gate. The circuit 156 may be implemented as a 2-input OR logic gate. In the $i^{th}$ circuit 150, the gate 152 may generate an input bit to the gate 156 by performing a logical AND of an input bit (e.g., $B_N[i]$) and an input bit (e.g., $A_N[j]$). The gate 154 may generate an output bit (e.g., $B_{N+1}[i]$) by performing a logical AND of the input bit $B_N[i]$ and an input bit (e.g., $B_N[j]$). The gate 156 may generate an output bit (e.g., $A_{N+1}[i]$) by performing a logical OR of an input bit (e.g., $A_N[i]$) and the input bit received from the gate 152. The vertical arrow below the shaded square may represent a 2-bit bus {$A_{N+1}[i], B_{N+1}\{i\}$}. The diagonal arrow below the shaded square may also represent the 2-bit bus {$A_{N+1}[i], B_{N+1}\{i\}$}. Individually and/or collectively, the signals produced by the circuits 150 may be referred to as second signals.

Figure 8C:
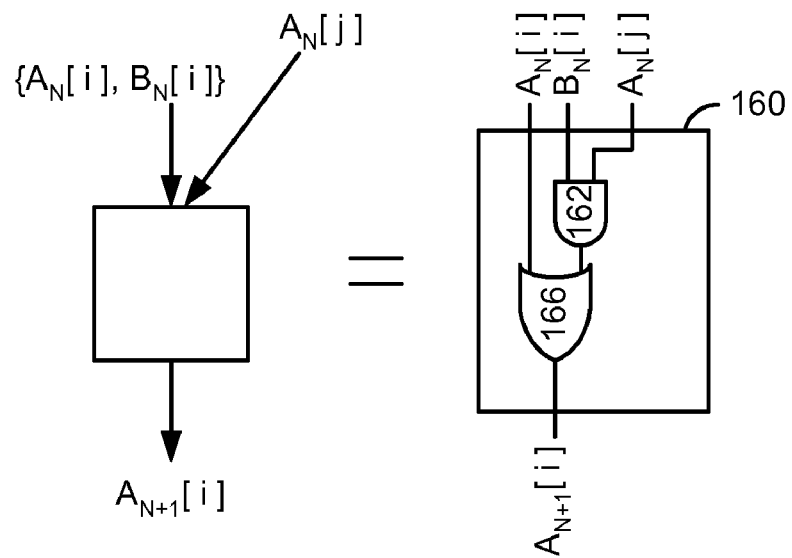

In FIG. 8C, a white square notation may represent a reduced variant of T implemented by a circuit 160, where only a leftmost output bit (e.g., x1|x2&y1) may be generated. Each of the circuits 160 generally comprises a gate 162 and a gate 166. The gates 162 and 166 may be connected in the same fashion as the gates 152 and 156 in the circuit 150. In the $i^{th}$ circuit 160, the gate 162 may generate an input bit to the gate 166 by performing a logical AND of an input bit (e.g., $B_N[i]$) and an input bit (e.g., $A_N[j]$). The gate 166 may generate an output bit (e.g., $A_N[i]$) by performing a logical OR of the input bit $A_N[i]$ and the input bit received from the gate 162. The vertical arrow below the white square may represent a 1-bit signal $A_{N+1}[i]$. Individually and/or collectively, the signals presented by the circuits 160 may be referred to as the enable signal E (e.g., E[k]=$A_{(N+1)}[i]$, where k=(i+N-1)% N).

Figure 8D:
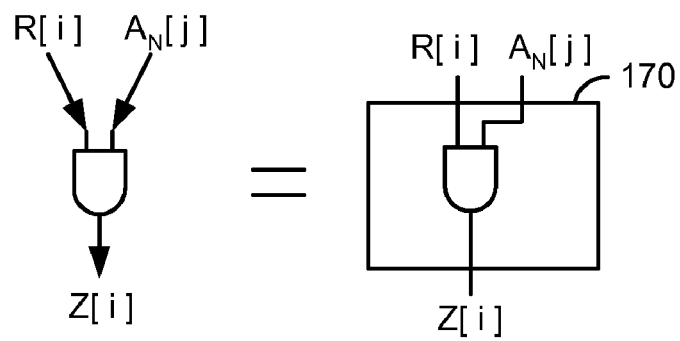

In FIG. 8D, an AND gate notation may represent a 2-input AND logic gate 170. In the $i^{th}$ gate 170, the output bit Z[i] may be generated by performing a logical AND of the input bit R[i] and the input bit $A_N[j]$. The input bit $A_N[j]$ is generally the component E[i] of the signal E, where i=(j+1)% N. The vertical arrow below the gate may represent a 1-bit signal Z[i]. Individually and/or collectively, the signals presented by the circuits 170 may be referred to as the output signal Z.

Figure 9:
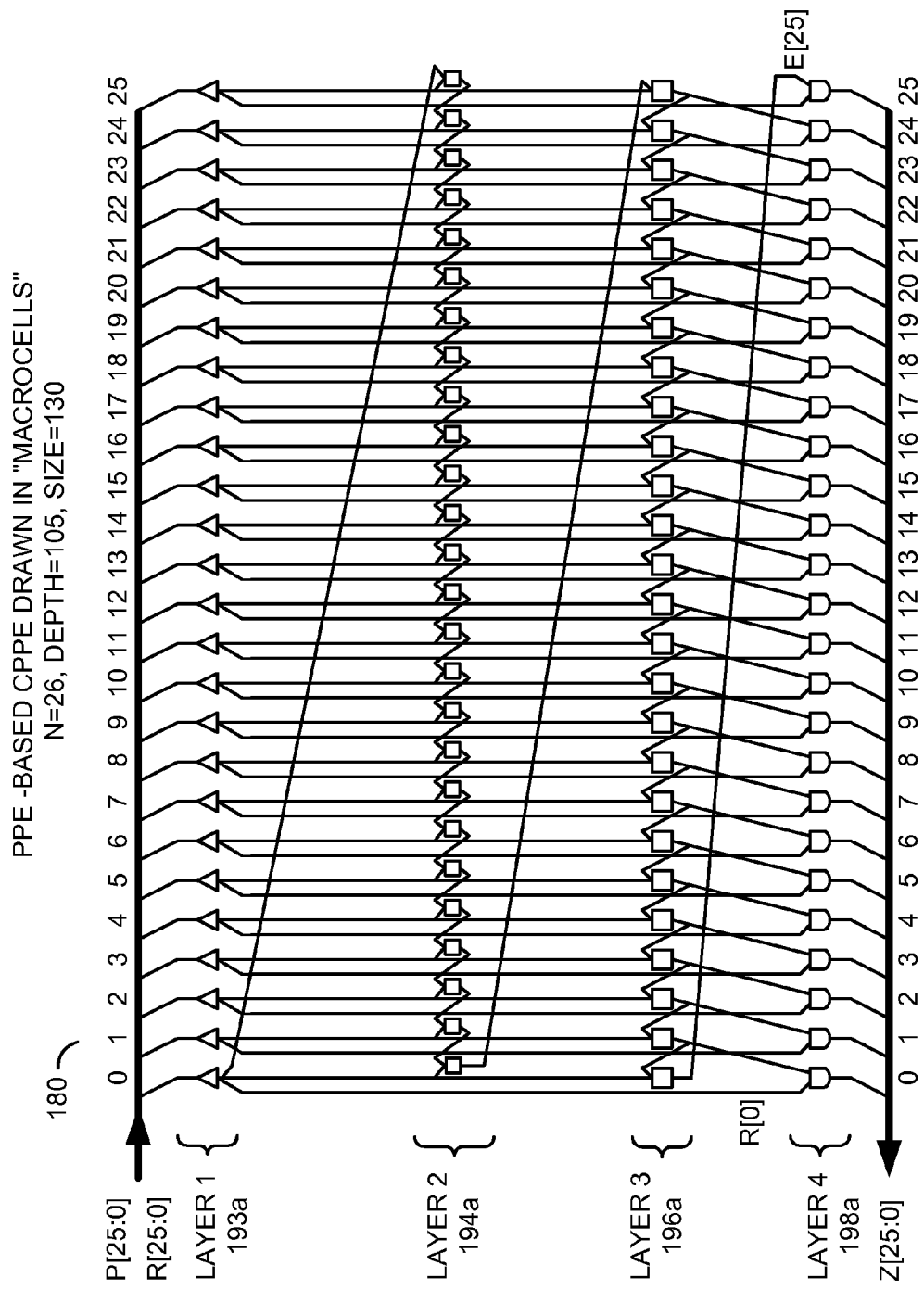
FIG. 9 is a block diagram of the circuit shown in FIG. 8 using the shortcut notations.

Referring to FIG. 9, a block diagram of the circuit 180 using the shortcut notations is shown. The inverters 182a-182n may be presented in a first layer 193a by the triangle notation. The gates 184a-184n and 190a-190n may be represented in a second layer 194a by the white square notation. The gates 186a-186n and 192a-192n may be represented in a third layer 196a by the white square notation. The gates 188a-188n may be represented in a fourth layer 198a by the AND gate notation.

Embodiments of the present invention may implement the PPE and the CPPE circuitry based on (i) a "binary" Kogge-Stone approach, (ii) a "Fibonacci" method of Gashkov et al. and (iii) combinations of the two approaches. The Kogge-Stone approach is generally described in "A Parallel Algorithm for the Efficient Solution of a General Class of Recurrence Equations", by Peter M. Kogge and Harold S. Stone, IEEE Transaction on Computers, 1973, C-22, pp. 783-791, which is hereby incorporated by reference. The Gashkov et al. approach is generally described in U.S. Pat. No. 6,934,733, which is hereby incorporated by reference.

The two methods are generally based on translations of AND-OR-chains in binary logic into a special associative operation of a quaternary logic. The property of associativeness generally enables chained calculations to be reorganized into trees, thus reducing the depth without increment of gate count. Consider the four values of a quaternary logic to be represented as pairs of binary values: $\{0,0\}, \{0,1\}, \{1,0\}, \{1,1\}$. Furthermore, let an operation $T(X, Y)$ where $T=\{t1,t2\}$, $X=\{x1,x2\}$, $Y=\{y1,y2\}$ (which may be treated as a 2-input operation over the quaternary logic, or as a pair (t1,t2) of 4-input functions over the standard binary Boolean logic, with inputs x1, y1, x2, y2) be given as follows:

$$t1 = x1 | x2 \& y1$$

$$t2 = x2 \& y2$$

The associativeness of T may be proven directly as follows:

$$\text{if } X = \{x1, x2\}, Y = \{y1, y2\}, Z = \{z1, z2\},$$
$$\text{then } T(X, Y) = \{x1 | x2 \& y1, x2 \& y2\}$$
$$T(T(X, Y), Z) = \{x1 | x2 \& y1 | x2 \& y2 \& z2, x2 \& y2 \& z2\}$$
$$= \{x1 | x2 \& (y1|y2 \& z2), x2 \& y2 \& z2\}$$
$$\text{and } T(Y, Z) = \{y1 | y2 \& z1, y2 \& z2\}$$
$$T(X, T(Y, Z)) = \{x1 | y1 \& (y1|y2 \& z1), x2 \& y2 \& z2\}$$

thus $T(T(X,Y),Z)=T(X,T(Y,Z))$. Therefore, operation T is associative.

For any even number N, the chain $T(\{A[N-1], A[N-2]\}, T(\{A[N-3], A[N-4]\} \ldots T(A[1], A[0]) \ldots )))$ generally computes a pair $\{t1,t2\}$, where $t1=F_N(t[N-1], \ldots, t[0])$, and $t2=t[N-2] \& t[N-4] \& \ldots \& t[0]$. As such, computing of the T-chains may be used to compute the function $F_N$.

A given circuit designed according to the "binary" approach may have the following parts: an initialization step; a series of "duplication" steps; and a final ("masking") step. Each of the steps generally has a low depth (e.g., 1-2 logic levels). The steps may be sequentially connected in a chain with the following exception: in some embodiments, a portion of the inputs to the last step may be received directly from the initialization steps.

In the "binary" approach to an N-bit PPE, the initialization step may be included as follows:
$\{A_0[i], B_0[i]\}=\{P[i], \sim R[i]\}, i=0 \ldots N-1$ and about $k=\log_2 N$ "duplication" steps as follows:
$\{A_1[i], B_1[i]\}$ is:
if $i+1 \geq N$, then $\{A_0[i], B_0[i]\}$
else $T(\{A_0[i], B_0[i]\}, \{A_0[i+1], B_0[i+1]\})$
$\{A_2[i], B_2[i]\}$ is:
if $i+2 \geq N$, then $\{A_1[i], B_1[i]\}$
else $T(\{A_1[i], B_1[i]\}, \{A_1[i+2], B_1[i+2]\})$
$\{A_3[i], B_3[i]\}$ is:
if $i+4 \geq N$, then $\{A_2[i], B_2[i]\}$
else $T(\{A_2[i], B_2[i]\}, \{A_2[i+4], B_2[i+4]\})$
$\{A_4[i], B_4[i]\}$ is:
if $i+8 \geq N$, then $\{A_3[i], B_3[i]\}$
else $T(\{A_3[i], B_3[i]\}, \{A_3[i+8], B_3[i+8]\})$
...

Generally, the value added to i is doubled each time and the process may stop when the sum $1+2+4+8+ \ldots$ of the values becomes greater than N−3. As such, the number of steps is approximately $\log_2 N$.

Figure 10:
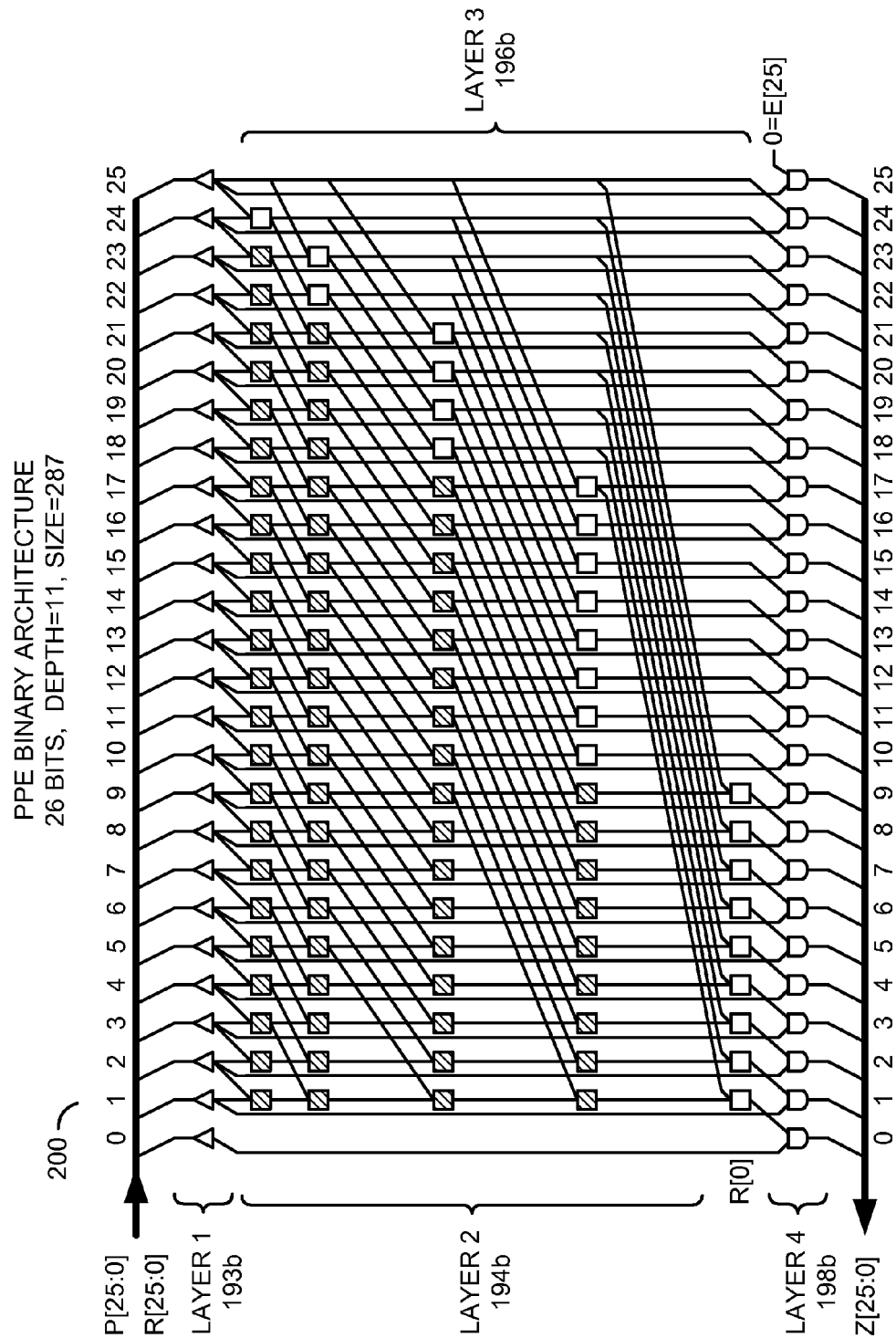
FIG. 10 is a block diagram of an example implementation of a PPE circuit implemented by a binary architecture.

The values $A_k[i+1]$ generated by the last duplication step generally form an enable mask in the signal E to be combined with input components R[i] of the signal R in the last (masking) step to create the signal Z. Each of the components Z[i] of the signal Z may be defined as follows:
if $i+1 \geq N$ then $Z[i]=0$
else $Z[i]=A_k[i+1] \& R[i]$ Referring to FIG. 10, a block diagram of an example implementation of a PPE circuit 200 is shown in accordance with a preferred embodiment of the present invention. The circuit 200 generally implements the above binary architecture and illustrates an example input size of 26 bits (e.g., N=26). Other input sizes may be implemented to meet the criteria of a particular application. The circuit 200 is generally represented by multiple triangle notations in a first layer 193b, multiple shaded square notations in a second layer 194b, multiple white square notations in a third layer 196b and multiple AND gate notations in a fourth layer 198b.

Note that not all of the operators T in the duplication steps may be arranged such that both outputs are in use: for each bit line i, the last operator T may be such that only the output A is utilized in further computations (e.g., parts of the mask signal E). Thus, the computations may be re-partitioned in 4 layers, where all computation units in each individual layer may be identical. For example, the first layer 193b may implement the initialization step using the NOT gates. The second layer 194b generally covers most circuitry of the duplication steps, namely, all of the operators T such that both outputs are utilized. The third layer 196b may cover the rest of the duplication circuitry, including "simplified" version of T (e.g., containing only the computation of the function t1). The fourth layer 198b generally implements the masking step using the AND gates.

The circuit 200 generally has a stop condition of $1+2+4+8+ \ldots \geq N-3$. Under the stop condition, signals from the last $(N-1)^{th}$ input (e.g., R[25]) may reach the $0^{th}$ output (e.g., Z[0]). For large values of N, the binary approach generally comprises about $3N \log_2 N$ two-input logic gates and produces a circuit depth of about $2 \log_2 N$ logic gate levels.

A "Fibonacci" approach may be used to reduce the depth of a PPE. The depth reduction is generally based on the following observation on the operation T: in $T(\{x1,y1\},\{x2,y2\})$, input x1 may arrive one logic level later than all other inputs without affecting the output delay. The Fibonacci approach may be expressed as a number of computational steps, where the intermediate values may also be named via A and B. In particular, $\{A_0[i], B_0[i]\}$ and $\{A_1[i], B_1[i]\}$ (note that the variables may be indexed as "$1^{st}$" and "$0^{th}$") may be defined in the same way as used above (e.g., the circuit starts with the same initialization step and the first duplication step as under the binary approach). The remaining computations may differ, because "Fibonacci" steps may be used instead of the "duplication" steps, namely:
$\{A_2[i], B_2[i]\}$ is:
if $i+2 \geq N$, then $\{A_1[i], B_1[i]\}$
else $T(\{A_1[i], B_1[i]\}, \{A_0[i+2], B_0[i+2]\})$
$\{A_3[i], B_3[i]\}$ is:
if $i+3 \geq N$, then $\{A_2[i], B_2[i]\}$ else T({$A_2[i]$, $B_2[i]$}, {$A_1[i+3]$, $B_1[i+3]$})
{$A_4[i]$, $B_4[i]$} is:
if i+5≧N, then {$A_3[i]$, $B_3[i]$}
else T({$A_2[i]$, $B_3[i]$}, {$A_2[i+5]$, $B_2[i+5]$})
{$A_5[i]$, $B_5[i]$} is:
if i+8≧N, then {$A_4[i]$, $B_4[i]$}
else T({$A_4[i]$, $B_4[i]$}, {$A_3[i+8]$, $B_3[i+8]$})
. . .

The value added to i is generally taken from the classical Fibonacci sequence 1, 2, 3, 5, 8 . . . , where each element of the sequence may be the sum of the two previous elements: 1+2=3, 2+3=5, 3+5=8 etc. The process may stop when the sum 1+2+3+5+8+ . . . of the values becomes greater than N−3. The number of steps may yield approximately 1.44 $\log_2$ N logic gate levels.

The values $A_k[i+1]$ of the last Fibonacci step generally form the enable mask (e.g., signal E) to be combined with the signal R in the last (masking) step, the same way as in the binary method:
Z[i] is:
if i+1≧N then 0
else $A_k[i+1]$ & R[i]

Figure 11:
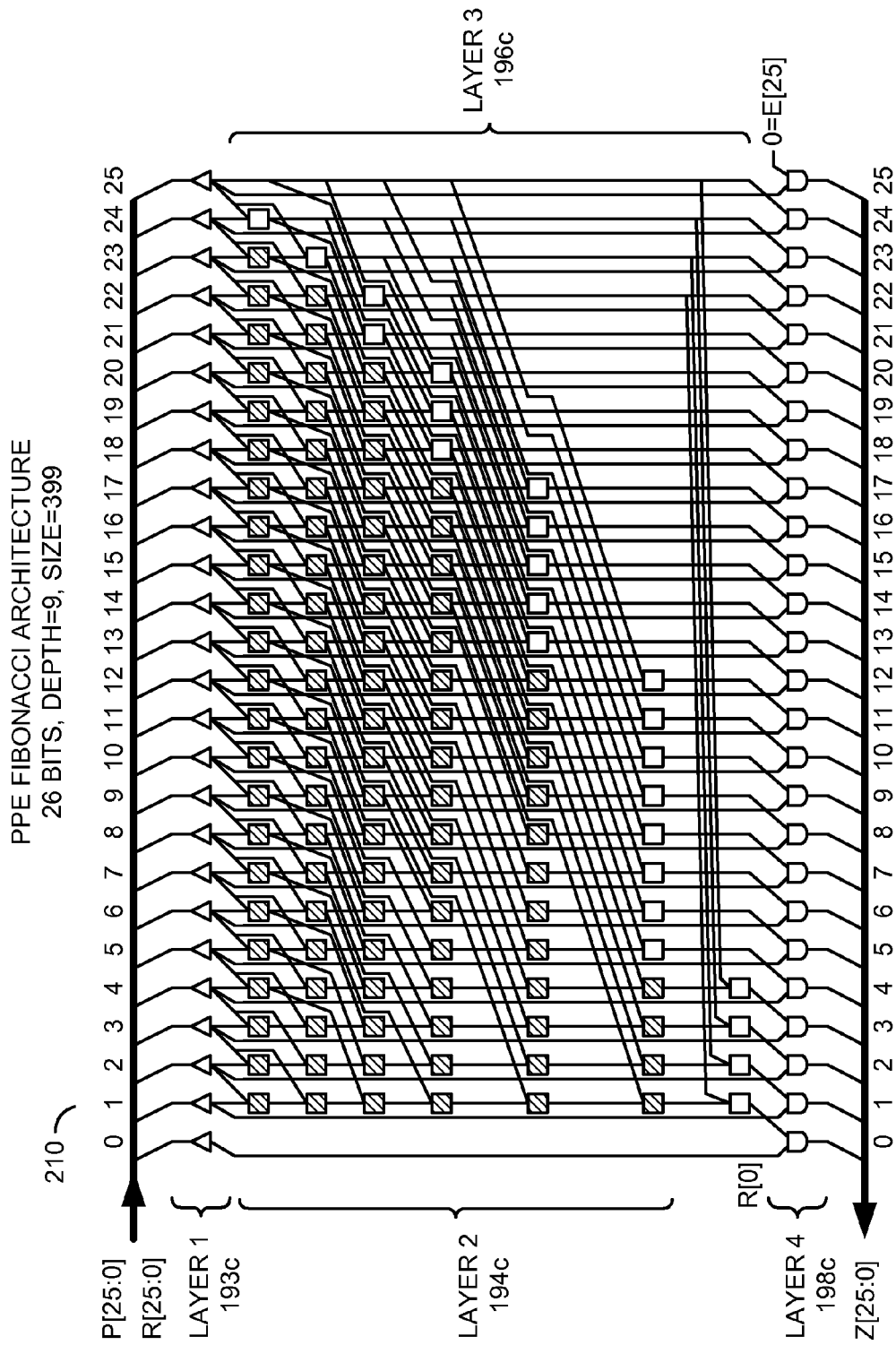
FIG. 11 is a block diagram of an example implementation of a PPE circuit implemented by a Fibonacci architecture.

Referring to FIG. 11, a block diagram of an example implementation of a PPE circuit 210 is shown. The circuit 210 generally implements the Fibonacci architecture and illustrates an example input size of 26 bits (e.g., N=26). Other input sizes may be implemented to meet the criteria of a particular application. The circuit 210 is generally represented by multiple triangle notations in a first layer 193c, multiple shaded square notations in a second layer 194c, multiple white square notations in a third layer 196c and multiple AND gate notations in a fourth layer 198c. The layers may be defined in a similar fashion as for the binary method and thus have referral indices similar to FIG. 10.

For large values of N, the Fibonacci approach generally has about 4.32N $\log_2$ N two-input logic gates. The Fibonacci approach may produce circuit depths of about 1.44 $\log_2$ N logic gate levels. The Fibonacci approach generally has fewer gate levels (and thus may produce faster circuits) than the binary approach in trade for larger circuits (e.g., containing more logic gates and wires) than the binary approach.

A mixed approach may be used to reduce the size of a PPE. For certain values of N, the total number of gates may be reduced over the Fibonacci approach while maintaining the same depth. The mixed approach generally combines "duplication" steps of the form T({A[i], B[i]}, {A[i+C], B[i+C]}) and the Fibonacci steps T({A[i], B[i]}, {A'[i+C], B'[i+C]}), where the two groups of inputs may be taken from two different steps.

Figure 12:
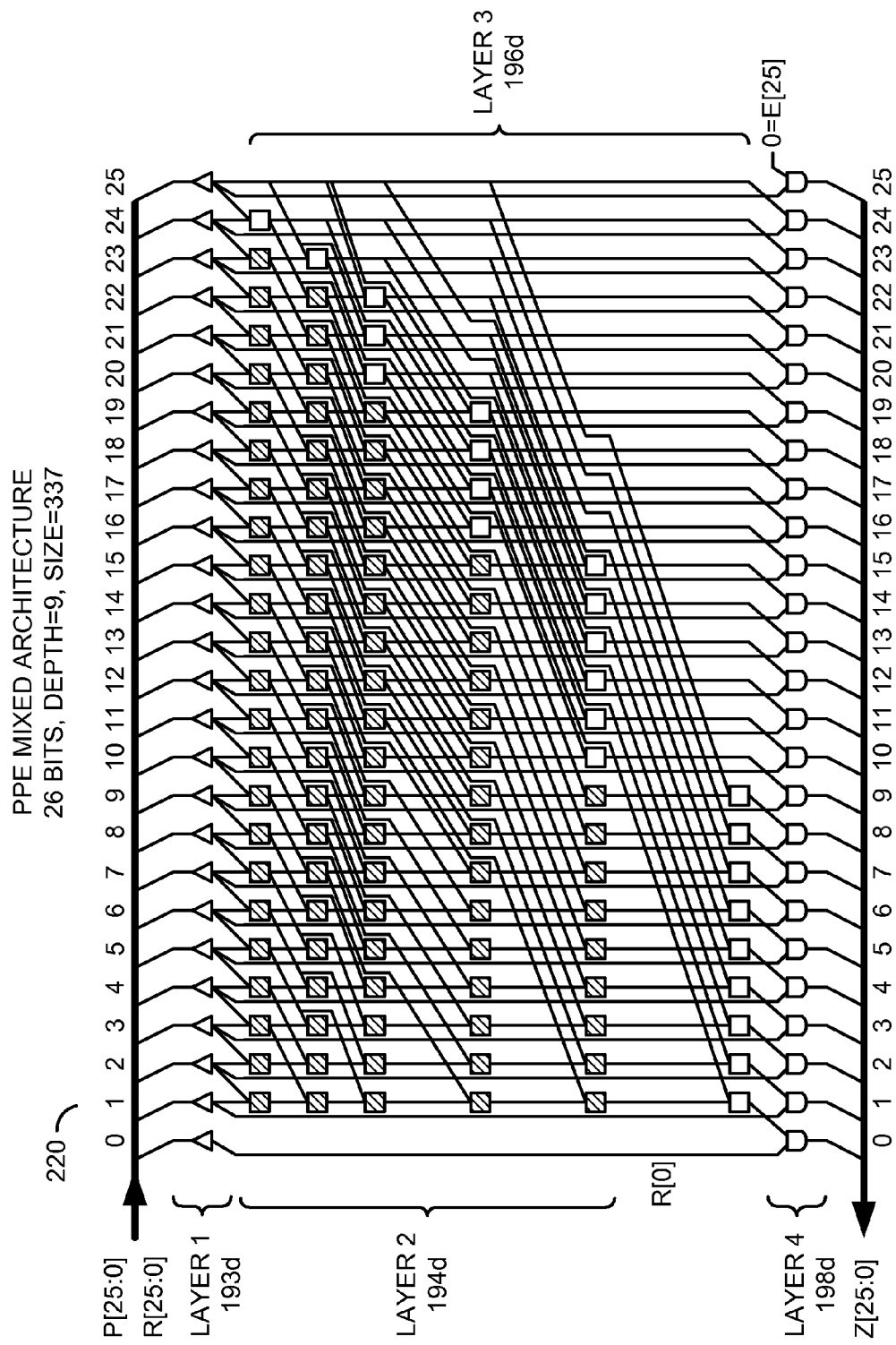
FIG. 12 is a block diagram of an example implementation of a PPE circuit implemented by a mixed approach architecture.

Referring to FIG. 12, a block diagram of an example implementation of a PPE circuit 220 is shown. The circuit 220 generally implements the mixed approach architecture and illustrates an example input size of 26 bits (e.g., N=26). Other input sizes may be implemented to meet the criteria of a particular application. The circuit 220 is generally represented by multiple triangle notations in a first layer 193d, multiple shaded square notations in a second layer 194d, multiple white square notations in a third layer 196d and multiple AND gate notations in a fourth layer 198d.

The illustration generally includes two duplication steps. In particular, {$A_0[i]$, $B_0[i]$}, {$A_1[i]$, $B_1[i]$} and {$A_2[i]$, $B_2[i]$} may be defined in the same way as in the binary approach. The Fibonacci steps may be used as follows:
{$A_3[i]$, $B_3[i]$} is:
if i+4≧N, then {$A_2[i]$, $B_2[i]$}
else T({$A_2[i]$, $B_2[i]$}, {$A_1[i+4]$, $B_1[i+4]$})
{$A_4[i]$, $B_4[i]$} is:
if i+6≧N, then {$A_3[i]$, $B_3[i]$}
else T({$4_3[i]$, $B_3[i]$}, {$A_2[i+6]$, $B_2[i+6]$})
{$A_5[i]$, $B_5[i]$} is:
if i+10≧N, then {$A_4[i]$, $B_4[i]$}
else T({$A_4[i]$, $B_4[i]$}, {$A_3[i+10]$, $B_3[i+10]$})
{$A_5[i]$, $B_6[i]$} is:
if i+16≧N, then {$A_5[i]$, $B_5[i]$}
else T({$A_5[i]$, $B_5[i]$}, {$A_4[i+16]$, $B_4[i+16]$})
Z[i] is:
if i+1≧N then 0
else $A_6[i+1]$ & R[i]

Notice that the "mixed" circuit 220 may have the same depth as the "Fibonacci" circuit 210, but may contain fewer logic gates.

To formally define the mixed approach, a universal description may be established. Notice that the universal approach generally covers both the binary approach and the Fibonacci approach as two special cases of the mixed approach. Designs of the universal kind may be defined by a sequence of steps in computing {$A_0[i]$, $B_0[i]$}, {$A_1[i]$, $B_1[i]$}, . . . , {$A_k[i]$, $B_k[i]$} and finally Z[i], i=0 . . . N, where $A_0$, $B_0$, $A_1$, $B_1$ and Z may always be computed in the same way as shown above. However, the computations for $A_2$, $B_2$ . . . $A_k$, $B_k$ may vary.

To describe the possible variants, a description sequence S[0] . . . S[k] may be introduced, where the number S[j] is generally defined such that {$A_j[i]$, $B_j[i]$} depends only on primary inputs P[t], R[t] for i≦t<i+S[j]. A value of S[0] may be 1, because $A_0[i]$ and $B_0[i]$ depend only on P[i] and R[i]. If the $j^{th}$ step is a duplication step, then S[j]=2S[j−1] and the step is as follows:
{$A_j[i]$, $B_j[i]$} is:
if i+S[j−1]≧N, then {$A_{j-1}[i]$, $B_{j-1}[i]$}
else T({$A_{j-1}[i]$, $B_{j-1}[i]$}, {$A_{j-1}[i+S[j-1]]$, $B_{j-1}[i+S[j-1]]$})

The above step may have two units of depth. If the $j^{th}$ step is a Fibonacci step, then S[j]=S[j−1]+S[j−2] and the step is as follows:
{$A_j[i]$, $B_j[i]$} is:
if i+S[j−1]≧N, then {$A_{j-1}[i]$, $B_{j-1}[i]$}
else T({$A_{j-1}[i]$, $B_{j-1}[i]$}, {$A_{j-2}[i+S[j-1]]$, $B_{j-2}[i+S[j-1]]$})

The above step may have one unit of depth. The last step should be such that S[k]≧N−2 (otherwise the circuit may not be a PPE). In such terms, all PPE designs under the above architecture may be described via the sequence S[0] . . . S[k].

Referring again to FIGS. 10-12, the circuit 200 may be described by a first sequence S={1, 2, 4, 8, 16, 32}. The first sequence generally results in 5 duplication steps and a depth of 2×5+1=11 logic gate levels. The circuit 210 may be described by a second sequence S={1, 2, 3, 5, 8, 13, 21, 34}. The second sequence may result in 1 duplication step plus 6 Fibonacci steps and a depth of 2+6+1=9 logic gate levels. The circuit 220 may be described by a third sequence S={1, 2, 4, 6, 10, 16, 26}. The third sequence may result in 2 duplication steps plus 4 Fibonacci steps and a depth of 2×2+4+1=9 logic gate levels. A choice between the different implementations of a PPE may be made under one or both of a size criteria and a timing criteria specified by a customer.

The above approaches may be applied to a binary CPPE generally in the same way as the binary PPE. The cyclical nature of a CPPE may be used in the steps for {$A_1[i]$, $B_1[i]$}, {$A_2[i]$, $B_2[i]$} etc., and in the last step to compute Z[i]. Namely, for an N-bit CPPE, the binary approach generally includes an initialization step of:
{$A_0[i]$, $B_0[i]$}={P[i], ~R[i]}, i=0 . . . N−1
and k=$\log_2$ N duplication steps:
{$A_1[i]$, $B_1[i]$}=T({$A_0[i]$, $B_0[i]$}, {$A_0[i']$, $B_0[i']$}) where i'= (i+1)% N $\{A_2[i], B_2[i]\} = T(\{A_1[i], B_1[i]\}, \{A_1[i'], B_1[i']\})$ where $i' = (i+2)\% N$ $\{A_3[i], B_3[i]\} = T(\{A_2[i], B_2[i]\}, \{A_2[i'], B_2[i']\})$ where $i' = (i+4)\% N$ $\{A_4[i], B_4[i]\} = T(\{A_3[i], B_3[i]\}, \{A_3[i'], B_3[i']\})$ where $i' = (i+8)\% N$

...

The value added to i may be doubled each time, and the process generally stops when the sum $1+2+4+8+\ldots$ of the values becomes greater than $N-2$. As such, the number of steps is approximately $\log_2 N$. The values $A_k[i+1]$ generated by the last stage may be the enable mask (e.g., the signal E) to be combined with inputs $R[i]$:

$$Z[i] = A_k[i'] \& R[i],$$

where $i' = (i+1)\% N$

Figure 13:
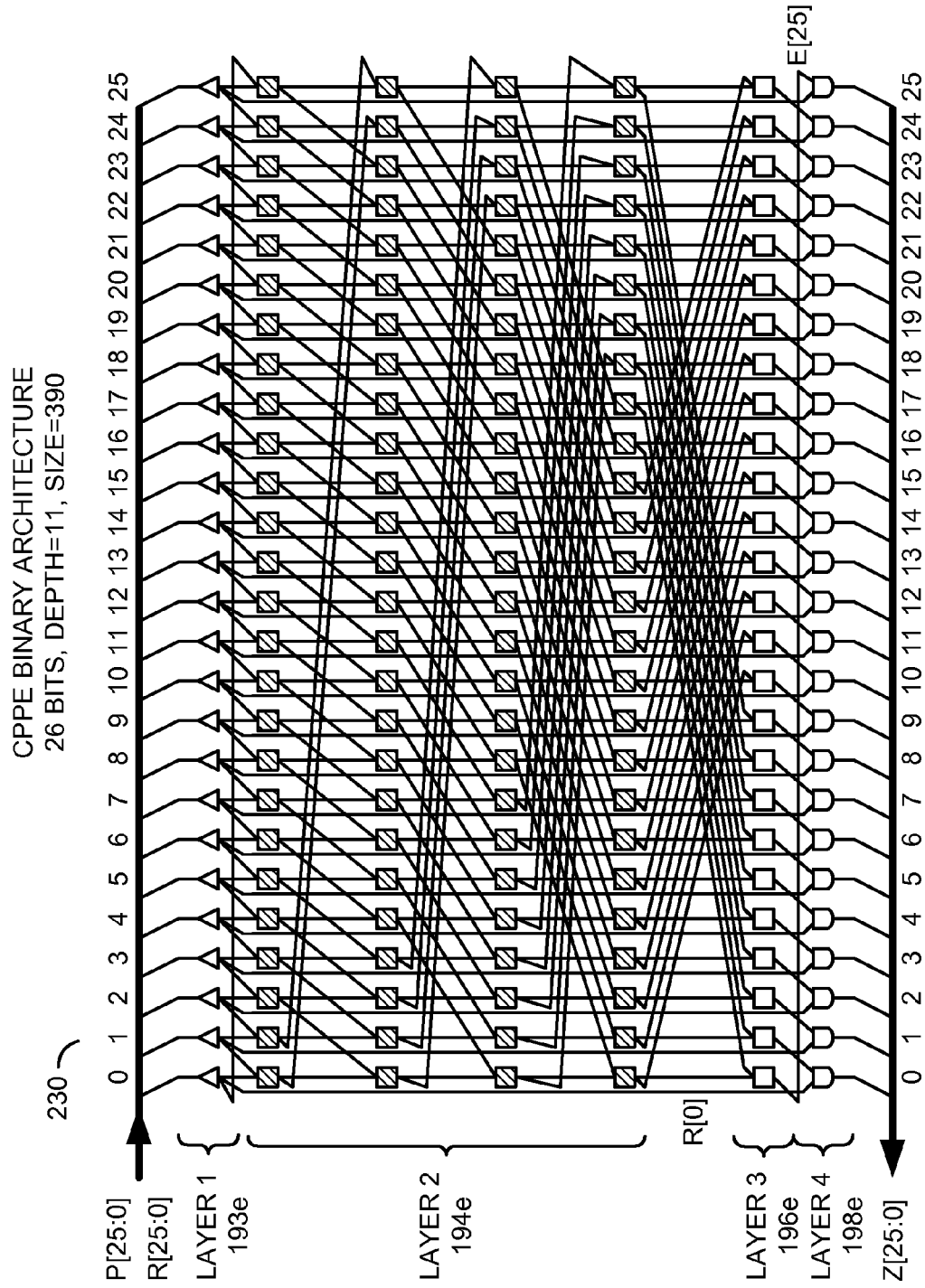
FIG. 13 is a block diagram of an example implementation of a CPPE circuit implemented by the binary architecture.

Referring to FIG. 13, a block diagram of an example implementation of a CPPE circuit 230 is shown. The circuit 230 generally implements the binary architecture and illustrates an example input size of 26 bits (e.g., N=26). Other input sizes may be implemented to meet the criteria of a particular application. The circuit 230 is generally represented by multiple triangle notations in a first layer 193e, multiple shaded square notations in a second layer 194e, multiple white square notations in a third layer 196e and multiple AND gate notations in a fourth layer 198e.

The circuit 230 generally has a stop condition of $1+2+4+4+8+\ldots \geq N-2$. Under the stop condition, signals from each pair of inputs may reach each output. For large values of N, the binary approach may utilize about $3N \log_2 N$ two-input gates and produces circuits of depth about $2 \log_2 N$ logic gate levels. Generally, such CPPEs may be "heavier" than PPEs for the same input size N and for the same particular variant of implementation, but the difference may be negligible where N is large.

The Fibonacci approach may be applied to a CPPE. In particular, $\{A_0[i], B_0[i]\}$ and $\{A_1[i], B_1[i]\}$ may be defined in the same way as above for the Fibonacci PPE. The Fibonacci CPPE computations may be as follows:

$\{A_2[i], B_2[i]\} = T(\{A_1[i], B_1[i]\}, \{A_0[i'], B_0[i']\})$ where $i' = (i+2)\% N$ $\{A_3[i], B_3[i]\} = T(\{A_2[i], B_2[i]\}, \{A_1[i'], B_1[i']\})$ where $i' = (i+3)\% N$ $\{A_4[i], B_4[i]\} = T(\{A_3[i], B_3[i]\}, \{A_2[i'], B_2[i']\})$ where $i' = (i+5)\% N$ $\{A_5[i], B_5[i]\} = T(\{A_4[i], B_4[i]\}, \{A_3[i'], B_3[i']\})$ where $i' = (i+8)\% N$

...

The value added to i may be taken from the classical Fibonacci sequence $1, 2, 3, 5, 8 \ldots$, where each element of the sequence may be the sum of the two previous elements: $1+2=3, 2+3=5, 3+5=8$ etc. The process generally stops when the sum $1+2+3+5+8+\ldots$ of the values becomes greater than $N-2$. The number of steps may be approximately $1.44 \log_2 N$.

The values $A_k[i+1]$ generated by the last stage may form the enable mask (e.g., the signal E) to be combined with inputs $R[i]$ in the same way as in the binary method:

$$Z[i] = A_k[i'] \& R[i],$$

where $i' = (i+1)\% N$

Figure 14:
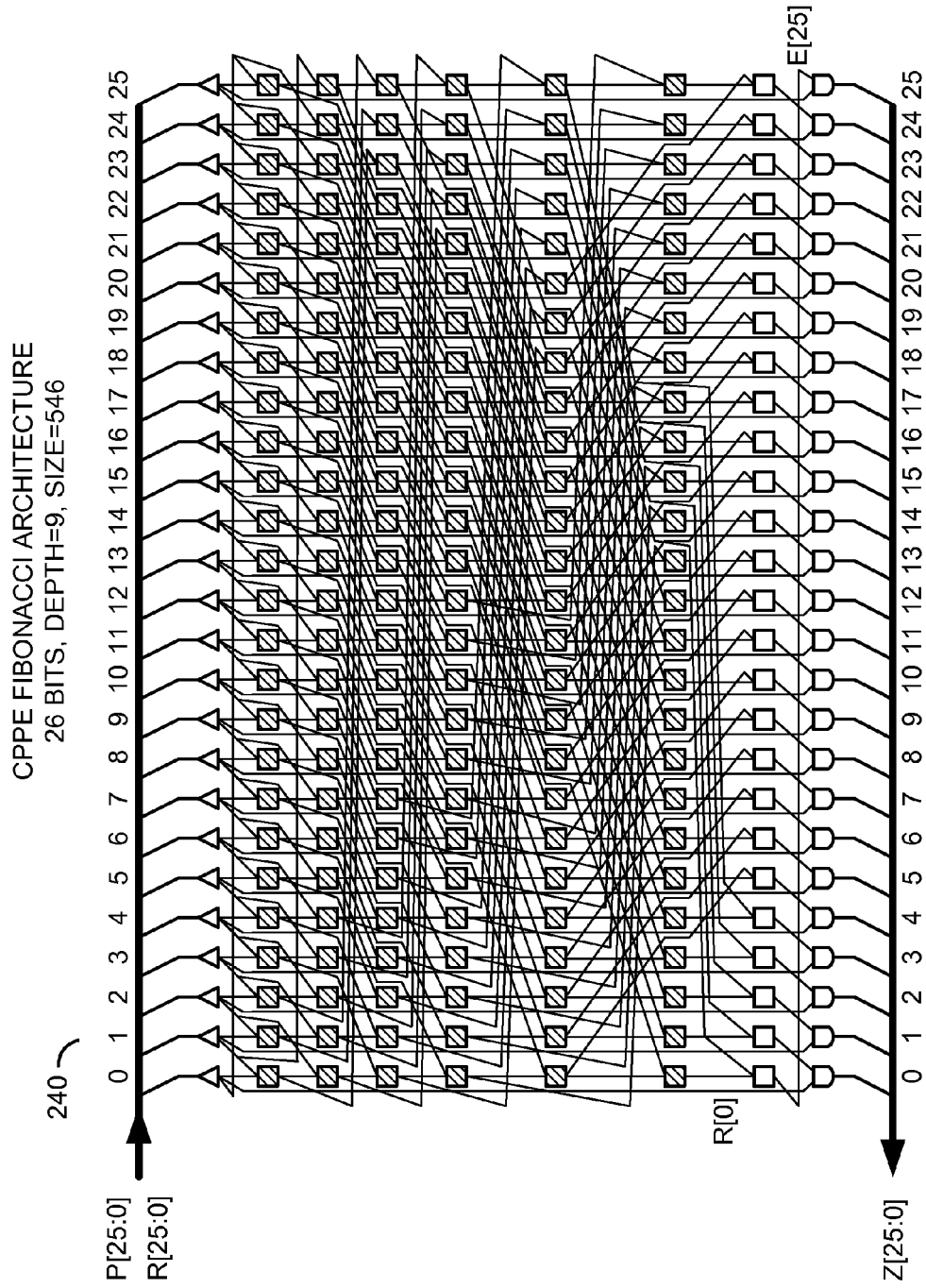
FIG. 14 is a block diagram of an example implementation of a CPPE circuit implemented by the Fibonacci architecture.

Referring to FIG. 14, a block diagram of an example implementation of a CPPE circuit 240 is shown. The circuit 240 generally implements the Fibonacci architecture and illustrates an example input size of 26 bits (e.g., N=26). Other input sizes may be implemented to meet the criteria of a particular application. For large values of N, the Fibonacci approach generally has about $4.32N \log_2 N$ two-input gates and may produce circuits of a depth of about $1.44 \log_2 N$ logic gate levels.

The mixed approach may also be applied to a CPPE. Application of the mixed approach to a CPPE may be the same as a PPE. The duplication steps of the form $T(\{A[i], B[i]\}, \{A[i+C], B[i+C]\})$ and Fibonacci steps $T(\{A[i], B[i]\}, \{A'[i+C], B'[i+C]\})$ may be combined where the two groups of inputs are taken from two different steps.

Figure 15:
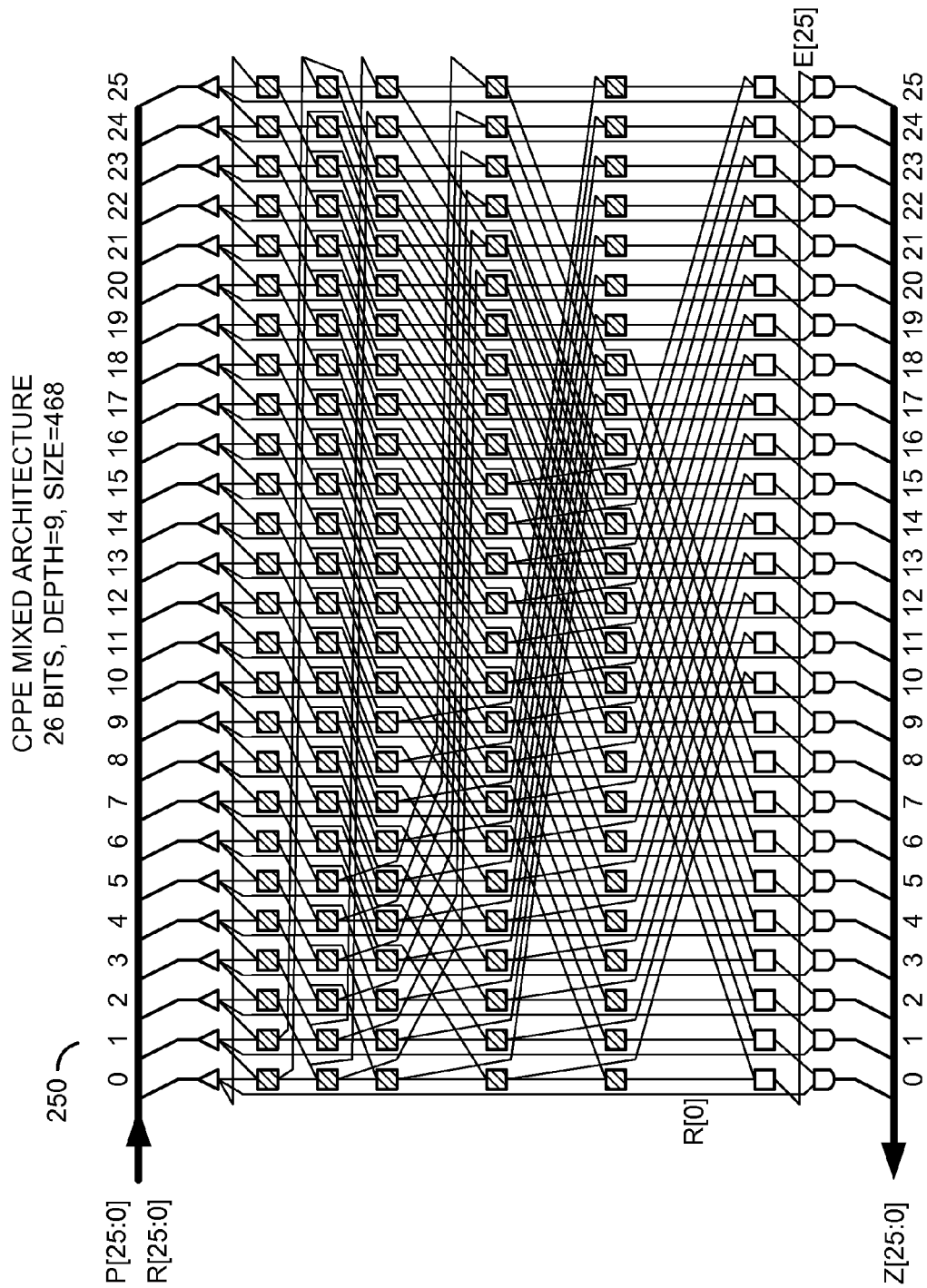
FIG. 15 is a block diagram of an example implementation of a CPPE circuit implemented by the mixed architecture.

Referring to FIG. 15, a block diagram of an example implementation of a CPPE circuit 250 is shown. The circuit 250 generally implements the mixed approach architecture and illustrates an example input size of 26 bits (e.g., N=26). Other input sizes may be implemented to meet the criteria of a particular application. The example generally shows two duplication steps. In particular, $\{A_0[i], B_0[i]\}, \{A_1[i], B_1[i]\}$ and $\{A_2[i], B_2[i]\}$ may be defined in the same way as in the pure binary method. The following Fibonacci steps may also be used:

$\{A_3[i], B_3[i]\} = T(\{A_2[i], B_2[i]\}, \{A_1[i'], B_1[i']\})$ where $i' = (i+4)\% 26$ $\{A_4[i], B_4[i]\} = T(\{A_3[i], B_3[i]\}, \{A_2[i'], B_2[i']\})$ where $i' = (i+6)\% 26$ $\{A_5[i], B_5[i]\} = T(\{A_4[i], B_4[i]\}, \{A_3[i'], B_3[i']\})$ where $i' = (i+10)\% 26$ $\{A_6[i], B_6[i]\} = T(\{A_5[i], B_5[i]\}, \{A_4[i'], B_4[i']\})$ where $i' = (i+16)\% 26$ $Z[i] = A_6[i] \& R[i]$ where $i' = (i+1)\% 26$ Designs of a universal kind may also be defined for a CPPE by a sequence of steps of computing $\{A_0[i], B_0[i]\}, \{A_1[i], B_1[i]\}, \ldots, \{A_k[i], B_k[i]\}$ and finally $Z[i], i=0 \ldots N$, where $A_0, B_0, A_1, B_1$ and Z may always be computed in the same way as shown above. However, the computations of $A_2, B_2 \ldots A_k, B_k$ may vary. To describe the possible variants, a description sequence $S[0] \ldots S[k]$ may be introduced, where the number $S[j]$ is generally defined such that $\{A_j[i], B_j[i]\}$ may depend only on the primary inputs $P[t], R[t]$ for $i \leq t < i+S[j]$. The value $S[0]$ may be 1. If the $j^{th}$ step is a duplication step, then $S[j] = 2S[j-1]$ and the step may be:

$\{A_j[i], B_j[i]\} = T(\{A_{j-1}[i], B_{j-1}[i]\}, \{A_{j-1}[i'], B_{j-2}[i']\})$,
where $i' = (i+S[j-1])\% N$ The above step may have 2 units of depth. If the $j^{th}$ step is a Fibonacci step, then the sequence $S[j] = S[j-1] + S[j-2]$ and the step may be:

$\{A_j[i], B_j[i]\} = T(\{A_{j-1}[i], B_{j-1}[i]\}, \{A_{j-2}[i'], B_{j-2}[i']\})$
where $i' = (i+S[j-1])\% N$ The above step generally has one unit of depth. The last step should be such that $S[k] \geq N-1$ (otherwise the circuit may not be a CPPE). In such terms, the CPPE designs may be described via the sequence $S[0] \ldots S[k]$.

Referring again to FIGS. 13-15, the circuit 230 may be defined by a first sequence $S = \{1, 2, 4, 8, 16, 32\}$. The first sequence may result in 5 duplication steps and have a depth of $2 \times 5 + 1 = 11$ logic gate levels. The circuit 240 may be defined by a second sequence $S = \{1, 2, 3, 5, 8, 13, 21, 34\}$. The second sequence may result in 1 duplication step plus 6 Fibonacci steps and a depth of $2+6+1 = 9$ logic gate levels. The circuit 250 may be defined by a third sequence $S = \{1, 2, 4, 6, 10, 16, 26\}$. The third sequence may result in 2 duplication steps plus 4 Fibonacci steps and have a depth of $2 \times 2 + 4 + 1 = 9$ logic gate levels. A choice between the different implementations of CPPE may be made under one or both of a size criteria and a timing criteria specified by a customer.

The functions performed by the diagrams of FIGS. 4 and 7-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a plurality of function circuits configured to generate a plurality of enable signals in response to (i) a request signal and (ii) a priority signal; and
   a plurality of logic circuits configured to generate collectively an output signal in response to (i) said enable signals and (ii) said request signal, wherein (a) a combination of said function circuits and said logic circuits establishes a programmable priority encoder and (b) at least three of said enable signals are generated independently of each other.

2. The apparatus according to claim 1, wherein (i) said request signal has N bits and (ii) a depth through said function circuits and said logic circuits is at most approximately $2 \log_2 N$ levels of two-input Boolean logic gates.

3. The apparatus according to claim 1, wherein (i) said function circuits comprise a plurality of first circuits and a plurality of second circuits and (ii) a subset of said second circuits receive a corresponding subset of said enable signals.

4. The apparatus according to claim 1, wherein at least three of said enable signals are routed exclusively to said logic circuits.

5. The apparatus according to claim 1, wherein said function circuits comprise a plurality of first circuits interconnected in a pattern forming a plurality of columns and a plurality of rows.

6. The apparatus according to claim 5, wherein each of said rows has a different number of said first circuits.

7. The apparatus according to claim 5, wherein each of said rows has a common number of said first circuits.

8. The apparatus according to claim 1, further comprising a plurality of first circuits coupled to said function circuits and configured to invert a respective bit of said request signal.

9. The apparatus according to claim 1, wherein each of said function circuits comprises a plurality of Boolean logic gates configured to generate (i) a first signal=A OR (B AND C) and (ii) a second signal=B AND D, where A, B, C and D are inputs.

10. The apparatus according to claim 1, wherein each of said function circuits comprises a plurality of Boolean logic gates configured to generate one of said enable signals=A OR (B AND C), where A, B and C are inputs.

11. The apparatus according to claim 1, wherein each of said logic circuits comprises a Boolean AND logic gate.

12. The apparatus according to claim 1, wherein said programmable priority encoder is configured to (i) divide said request signal into one or more subsets, one of said subsets corresponding to each given bit of said priority signal having a predetermined logical value and (ii) pass a highest priority bit in each respective one of said subsets from said request signal to said output signal.

13. The apparatus according to claim 1, wherein said programmable priority encoder comprises a circular programmable priority encoder in which an initial state of said enable signals matches a final state of said enable signals.

14. The apparatus according to claim 1, wherein (i) said request signal has 26 bits and (ii) a depth through said function circuits and said logic circuits is at most nine levels of two-input Boolean logic gates.

15. A method of priority encoding, comprising the steps of:
   (A) generating a plurality of enable signals in response to (i) a request signal and (i) a priority signal using a plurality of function circuits; and
   (B) generating an output signal in response to (i) said enable signals and (ii) said request signal using a plurality of logic circuits collectively, such wherein (a) a combination of said function circuits and said logic circuits establishes a programmable priority encoder and (b) at least three of said enable signals are generated independently of each other.

16. The method according to claim 15, wherein (i) said request signal has N bits and (ii) a depth through said function circuits and said logic circuits is at most approximately $2 \log_2 N$ levels of two-input Boolean logic gates.

17. The method according to claim 15, wherein said functions circuits comprise a plurality of first circuits and a plurality of second circuits, the method further comprising the step of:
routing a subset of said enable signals to a corresponding subset of said second circuits.

18. The method according to claim 15, further comprising the step of:
routing at least three of said enable signals exclusively to said logic circuits.

19. The method according to claim 15, further comprising the step of:
routing a plurality of bits of said request signal to each of said function circuits.

20. An apparatus comprising:
means for generating a plurality of enable signals in response to (i) a request signal and (ii) a priority signal; and
means for generating an output signal in response to (i) said enable signals and (ii) said request signal, wherein (a) a combination of said means for generating said enable signals and said means for generating said output signal establishes a programmable priority encoder and (b) at least three of said enable signals are generated independently of each other.

* * * * *